(12) United States Patent
Soheili

(10) Patent No.: US 9,521,729 B2
(45) Date of Patent: Dec. 13, 2016

(54) SYSTEMS AND METHODS FOR PROGRAMMING EMBEDDED DEVICES USING GRAPHICAL USER INTERFACE

(71) Applicant: Ramin Soheili, San Francisco, CA (US)

(72) Inventor: Ramin Soheili, San Francisco, CA (US)

( * ) Notice: Subject to any disclaimer, the term of this patent is extended or adjusted under 35 U.S.C. 154(b) by 302 days.

(21) Appl. No.: 13/900,656

(22) Filed: May 23, 2013

(65) Prior Publication Data

US 2014/0351733 A1   Nov. 27, 2014

(51) Int. Cl.
*H05B 37/02* (2006.01)
*G06F 9/445* (2006.01)

(52) U.S. Cl.
CPC ....... *H05B 37/0254* (2013.01); *G06F 9/44505* (2013.01); *Y02B 60/185* (2013.01)

(58) Field of Classification Search
CPC ...................................................... H05B 37/00
USPC ......................................................... 715/771
See application file for complete search history.

(56) References Cited

U.S. PATENT DOCUMENTS

| 5,902,166 A | 5/1999 | Robb | |
|---|---|---|---|
| 6,417,938 B1* | 7/2002 | Hsu | H04N 1/00519 358/504 |
| 7,085,627 B2* | 8/2006 | Bamberger et al. | 700/277 |
| 7,100,118 B1 | 8/2006 | Klask | |
| 8,302,072 B2 | 10/2012 | Chandhoke et al. | |
| 2003/0128240 A1 | 7/2003 | Martinez et al. | |
| 2007/0199432 A1* | 8/2007 | Abe et al. | 84/645 |
| 2011/0115413 A1* | 5/2011 | Erickson | H05B 37/029 315/312 |
| 2013/0018522 A1 | 1/2013 | Nuhfer et al. | |
| 2013/0124990 A1* | 5/2013 | Lettau | G11B 27/34 715/716 |
| 2013/0181636 A1* | 7/2013 | Agrawal | 315/307 |
| 2013/0191743 A1* | 7/2013 | Reid | G06F 3/04847 715/716 |
| 2013/0221872 A1* | 8/2013 | Gan et al. | 315/292 |
| 2013/0246089 A1* | 9/2013 | Gross | G06F 19/3406 705/2 |

* cited by examiner

*Primary Examiner* — Doon Chow
*Assistant Examiner* — James T Tsai
(74) *Attorney, Agent, or Firm* — Georgiy L. Khayet

(57) ABSTRACT

Provided is a graphical user interface for programming an embedded device and systems and methods of use thereof. The system for programming an embedded device using a graphical user interface (GUI) comprises the GUI, a processor, and a database. The embedded device includes one or more light sources. The GUI provides control elements associated with the light sources. The processor is configured to receive settings associated with the light sources via the control elements, the settings defining a lighting pattern of the light sources. The control elements include at least actuation, color, and brightness control elements. The processor can convert the settings into configuration data, which is transmitted to the embedded device and decoded by the embedded device. As a result of the decoding, the embedded device is set to generate the lighting pattern based on the configuration data.

18 Claims, 7 Drawing Sheets

SYSTEMS AND METHODS FOR PROGRAMMING EMBEDDED DEVICES USING GRAPHICAL USER INTERFACE

FIELD

This application relates generally to user interfaces for programming embedded devices and, more specifically, to systems and methods for programming embedded devices including light sources or other peripherals using a graphical user interface.

BACKGROUND

Embedded devices are programmable chips that can be programmed to execute certain operations. Embedded devices are wide-spread in all areas of human life. For example, a control panel in an elevator can include an embedded device.

Though embedded devices can have a variety of different applications, embedded device programming requires specialized skills and knowledge. Moreover, even for those having necessary skills and knowledge, programming embedded devices can take a lot of time and involve a significant effort. Therefore, facilitating of embedded device programming will be useful.

Additionally, teaching programming basics and correlations between programming parameters and control of internal device actions may be a difficult task.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for programming an embedded device using a graphical user interface. The method for programming an embedded device may comprise providing a graphical user interface (GUI). The embedded device may be associated with one or more light sources. The GUI may include actuation control elements configured to control turning on and turning off of the one or more light sources; color control elements configured to control color of the one or more light sources; and brightness control elements configured to control brightness of the one or more light sources. Via the actuation control elements, color control elements, and brightness control elements, settings defining a lighting pattern for the one or more light sources may be received from a user.

The settings may be converted to configuration data suitable for the embedded device. The configuration data may be then transmitted to the embedded device. The embedded device may decode the configuration data using the embedded programming instructions in order to set appropriate internal units, such as registers, timers, peripherals, and so forth so that the light sources connected to the embedded device generate a lighting pattern according to the configuration data.

In some embodiments, the control elements may include an iteration element. Via the iteration element, the user may cause the embedded device to decode a new configuration data lighting pattern to iterate in a round-robin manner.

Additionally, the control elements may include a simulation element to simulate the lighting pattern on a user request.

In some embodiments, the embedded device may include a toy, a flashing device, a lighting accessory, LED flashing items, and so forth. The light sources connected to the embedded device may include one or more light emitting diodes.

In some embodiments, the graphical user interface may be implemented as a cloud service.

Additional systems, methods, apparatuses, features, and aspects are realized through the techniques of various embodiments of the disclosure. Other embodiments and aspects of the disclosure are described in detail below and are considered a part of the claimed disclosure. Other embodiments and aspects can be understood with reference to the description and the drawings.

BRIEF DESCRIPTION OF DRAWINGS

Embodiments are illustrated by way of example and not limitation in the figures of the accompanying drawings, in which like references indicate similar elements and in which.

DETAILED DESCRIPTION

Systems and methods for programming an embedded device using a graphical user interface are described. The embedded device may be connected to one or more light sources and may control their operation. The graphical user interface may include control elements associated with various parameters of light sources. Thus, the graphical user interface may include actuation control elements, color control elements, brightness control elements, and so forth. The control elements may be graphical and intuitive so that a user could program the embedded device without coding. In such a way, even a user who has no programming skills may program the embedded device using GUI. The settings specified using GUI may define a lighting pattern associated with the lighting sources controlled by the embedded device.

The settings may be converted to configuration data decodable by the embedded device and transmitted to the embedded device. The embedded device may decode and apply the configuration data, thus causing the light sources to generate the lighting pattern in accordance to the configuration data settings.

Figure 1:
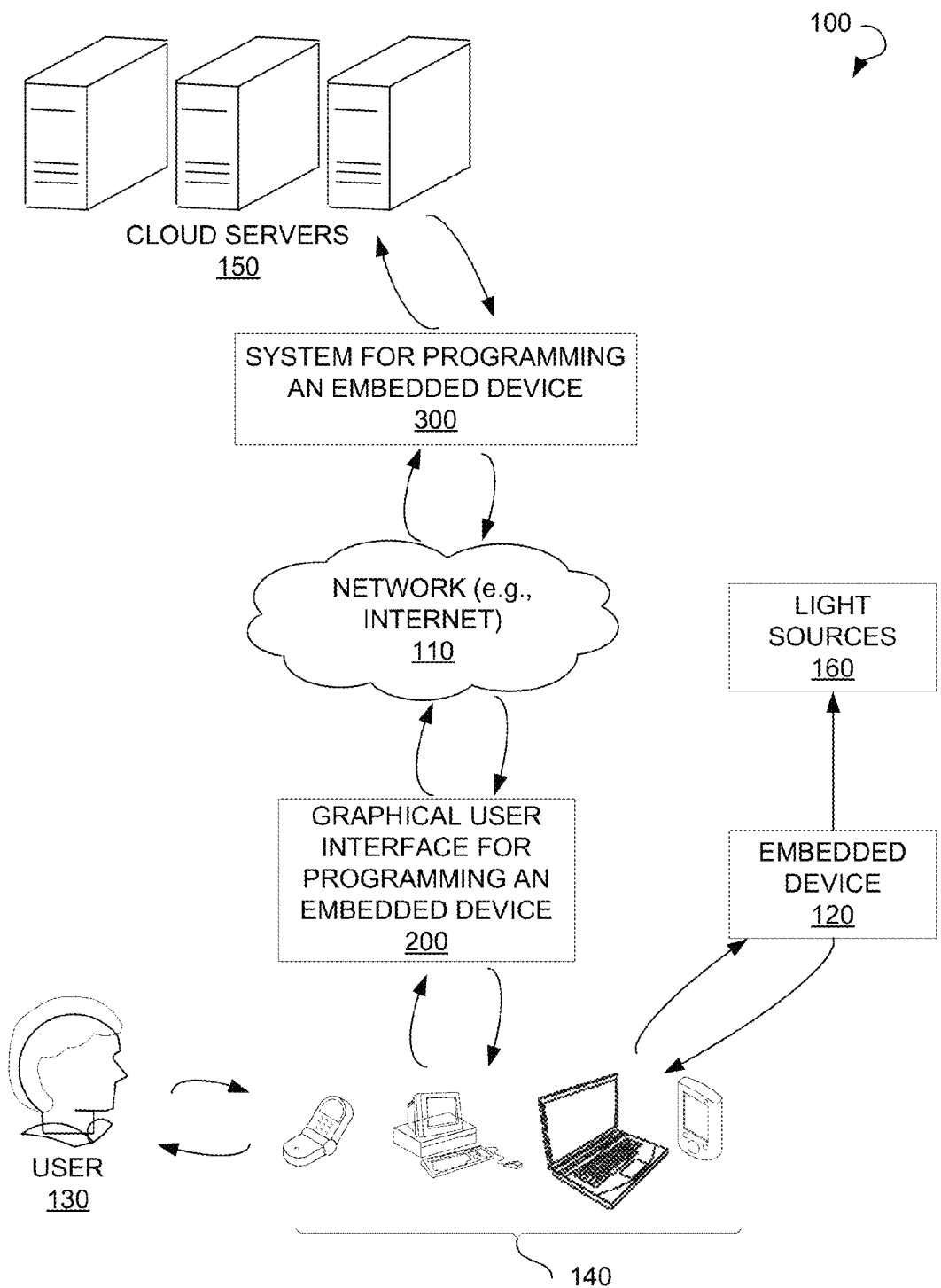
FIG. 1 illustrates an environment within which systems and methods for programming an embedded device using a GUI can be implemented, in accordance to some embodiments.

Referring now to the drawings, FIG. 1 illustrates an environment 100 within which systems and methods for programming an embedded device using a graphical user interface can be implemented, in accordance to some embodiments. The environment 100 may include an embedded device 120 controlling light sources 160, a graphical user interface 200 for programming an embedded device, a user device 140, and a user 130. The user device 140 may include a mobile telephone, a smartphone, a computer, a personal digital assistant (PDA), a laptop, a tablet personal computer (PC), and so forth.

Conventional computing devices, such as the user device 140, may provide various hardware capabilities, including a processor, a screen, a light source, a receiver, and a communications interface. Thus, in one embodiment of the present disclosure, a graphical user interface 200 for programming an embedded device may be accessed via the user device 140 to perform operations of a method for programming an embedded device. The user 130, in some example embodiments, may interact with an embedded device 120 via the graphical user interface 200 of a system 300 running on a user device 140.

The system 300 for programming an embedded device may reside on cloud servers 150 and be accessible via network 110. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The graphical user interface 200 may be displayed on a screen of the user device 140. The graphical user interface 200 may include control elements associated with various parameters and/or settings of the light sources 160. The user 130 may specify desired parameters and/or settings of the light sources 160 using control elements of the graphical user interface 200. The specified parameters and/or settings may be converted into configuration data suitable for the embedded device 120. The configuration data may be then transmitted to the embedded device 120. The embedded device 120 may decode the configuration data using embedded programming instructions and, based on the decoded configuration data, cause the light sources 160 to operate in accordance to the specified parameters and/or settings. Thus, the light sources 160 may generate a lighting pattern defined by the settings.

In some embodiments, the light sources 160 may include LEDs. The embedded device 120 may include a micro control unit (MCU) or a SoC engine. The light sources 160 and the embedded device 120 may form a LED flashing product (for example, a LED flashing bracelet, a LED flashing pendant, and so forth.

Figure 2:
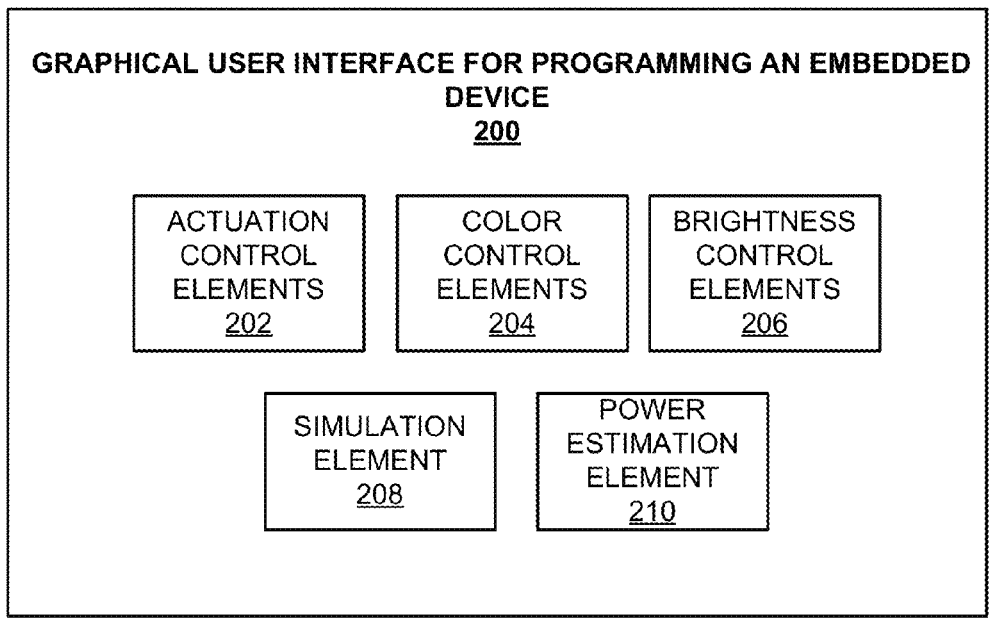
FIG. 2 illustrates a GUI for programming an embedded device, in accordance to some embodiments.

An example GUI 200 for programming an embedded device is illustrated by FIG. 2. The GUI 200 may comprise at least actuation control elements 202, color control elements 204, brightness control elements 206, a simulation element 208, and a power estimation element 210.

The actuation control elements 202 may be configured to control turning on and off of one or more light sources. The actuation control elements 202 may provide a graphical representation of ON and OFF intervals of a light source. A user may modify these periods using the actuation control elements 202.

The color control elements 204 may be configured to control colors of one or more light sources. For example, the color control elements 204 may include a color palette. A user may select a color for an ON interval of a light source. Different colors and/or different intervals may have different colors.

The brightness control elements 206 may be configured to control brightness of one or more light sources. Thus, a user may specify various brightness levels for a light source during an ON period of this light source. The brightness level may vary during an ON period.

Using the actuation control elements 202, color control elements 204, and/or brightness control elements 206, the user may compose a lighting pattern for the one or more light sources. Thus, when the parameters and settings of the control elements are executed, the one or more light sources may generate the lighting pattern according to the parameters and settings.

Additionally, the GUI 200 may include the simulation element 208. The simulation element 208 may be configured to simulate operation of the one or more light sources in accordance to the parameters and settings specified using the actuation control elements 202, color control elements 204, and/or brightness control elements 206.

In some embodiments, the GUI 200 may include an iteration element configured to control iteration of the lighting pattern.

Additionally, the GUI 200 may include a power estimation element 210 configured to estimate power consumption of the light sources generating lighting patterns according to the parameters and settings.

Figure 3:
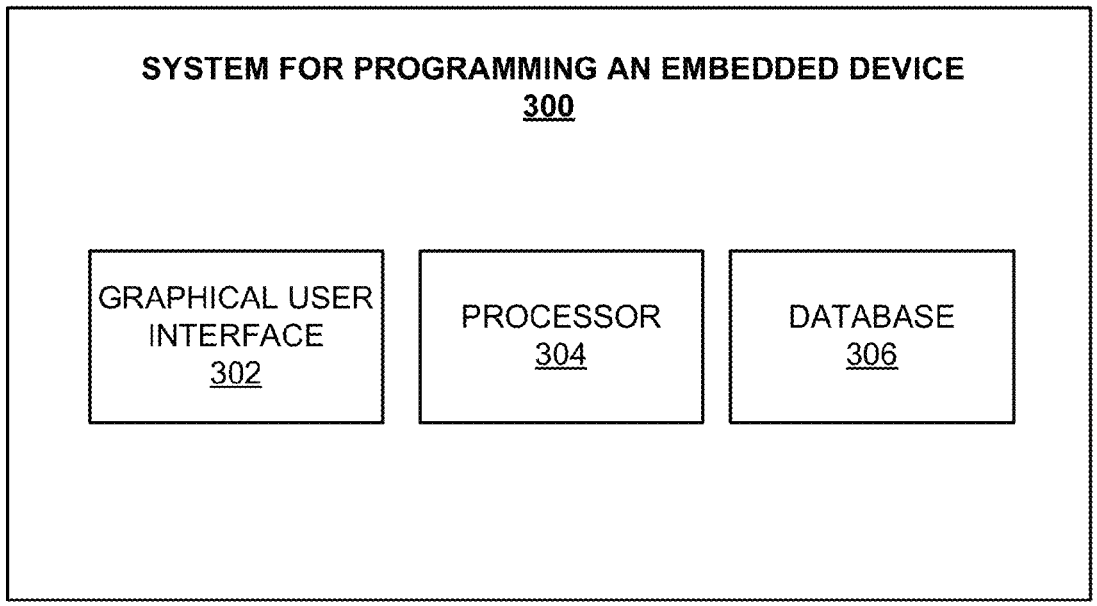
FIG. 3 illustrates a system for programming an embedded device using a GUI, in accordance with certain embodiments.

FIG. 3 illustrates a system 300 for programming an embedded device using a GUI. The embedded device can control one or more light sources. The system 300 may comprise a graphical user interface (GUI) 302, a processor 304, and a database 306. The GUI 302 may include control elements associated with the one or more light sources (for example, light emitting diodes) and be provided to a user via a user device. The control elements may include actuation, color, brightness, iteration, and so forth.

In some embodiments, the control elements may include a number selector to select a number of light sources. For example, if the embedded device controls 5 different LEDs, the number selector may be set to 5.

The user may define a desired lighting pattern for the light sources using the control elements. For example, the user may specify settings for turning on/off of the light sources, their color, and brightness. Additionally, the user may specify whether the lighting pattern should be repeated in a round robin manner or execute once only.

The settings, specified by the user via the control elements, may be received by the processor 304. The processor may then convert the settings into configuration data in a format decodable by the embedded device. Upon a user request, the processor 304 may transmit the configuration data to the embedded device or save the configuration data to the database 306.

When the configuration data is transmitted to the embedded device, the configuration data may be decoded using the embedded programming instructions. As a result of decoding, the internal units of the embedded device, such as registers, timers, peripherals, and so forth, may be set to generate the lighting pattern according to the configuration data.

In some example embodiments, one or more predefined sets of configuration data may be stored in the database 306. The user may modify the configuration data according to his/her needs and save the configuration data to the database 306 and/or apply the configuration data to the embedded device.

Figure 4:
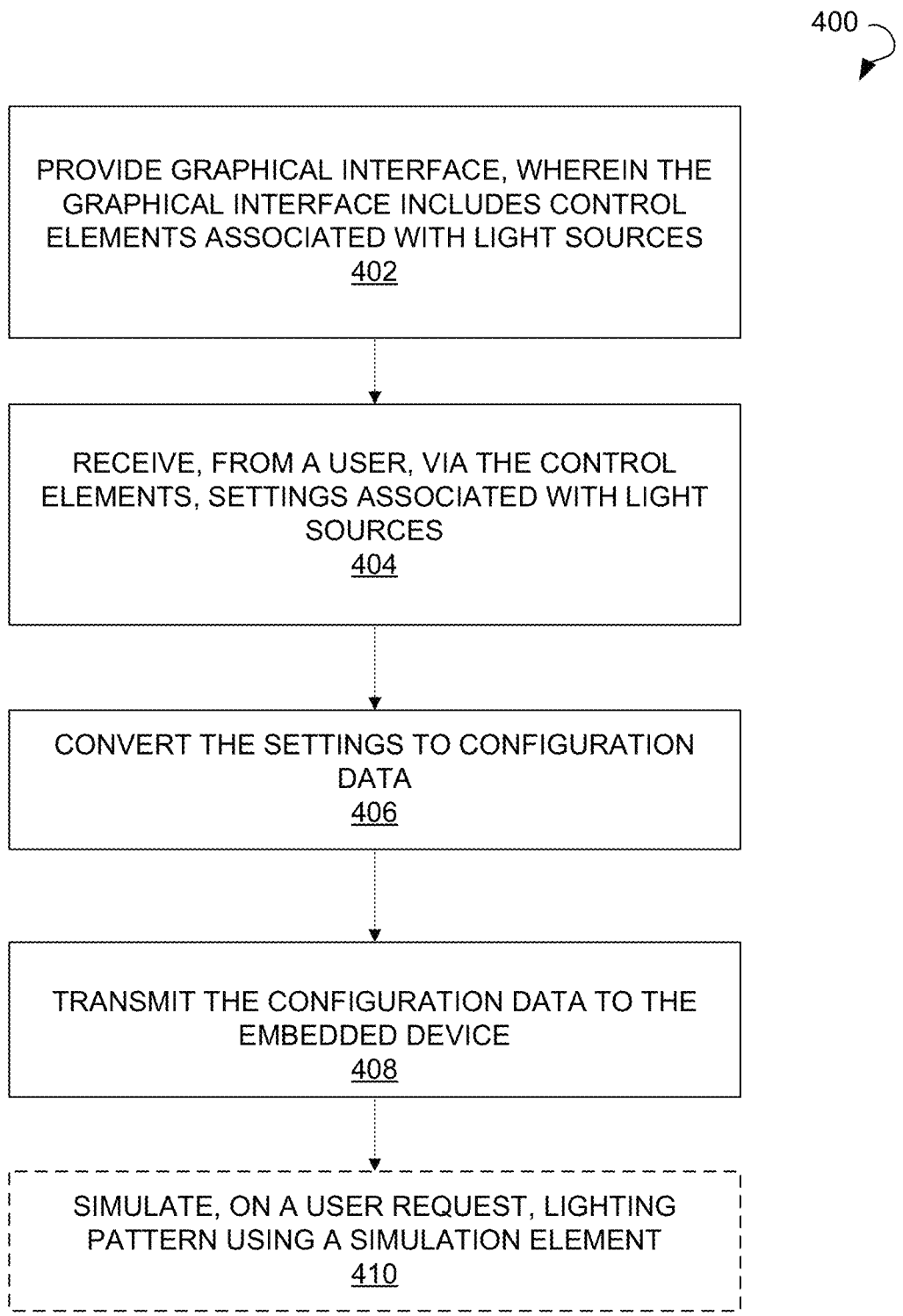
FIG. 4 is a flow chart illustrating a method for programming an embedded device using a GUI, in accordance with certain embodiments.

FIG. 4 is a process flow diagram showing a method 400 for programming an embedded device within an environment 100. The method 400 may be performed by logic that may comprise hardware (e.g., dedicated logic, programmable logic, and microcode), software (such as software run on a general-purpose computer system or a dedicated machine), or a combination of both. In one exemplary embodiment, the processing logic resides at a MCU or a SoC engine connected to a light source (for example, a set of light emitting diodes) that can perform the method 400. It will be appreciated by one of ordinary skill that examples of the foregoing modules may be virtual, and instructions said to be executed by a module may, in fact, be retrieved and executed by the MCU. Although various elements may be configured to perform some or all of the various operations described herein, fewer or more elements may be provided and still fall within the scope of various embodiments.

As shown in FIG. 4, the method 400 may commence with providing a graphical interface for programming an embedded device at operation 402. The embedded device may include one or more light sources (for example, light emitting diodes). The graphical interface may provide control elements associated with the light sources. For example, the control elements may include actuation control elements, color control elements, brightness control elements, and so forth. The actuation control elements may control turning on and turning off of the one or more light sources, the color control elements may control color of the one or more light sources, while brightness control elements may control brightness of the one or more light sources.

At operation 404, settings associated with the light sources may be received from a user. The settings may be received via the control elements and may define a lighting pattern of the one or more light sources. For example, the settings may define the order and timing of turning on and off, light intensity, color, and so forth.

The settings may be converted to configuration data at operation 406. The configuration data may have a format decodable by the embedded device.

The configuration data may be transmitted to the embedded device at operation 408. The embedded device may decode the configuration data using embedded programming instructions. As a result, the embedded device may be set to cause the controlled light sources to generate a certain lighting pattern.

The method 400 may further include an optional operation 410 of simulating the lighting pattern using a simulation element of the GUI. Thus, the user may preview the lighting pattern as well as the power estimation before transmitting it to the embedded device.

In some embodiments, an iteration command may be received via an iteration element of the GUI. The iteration command may cause the settings to be executed recurrently.

In some embodiments, the graphical user interface may be provided as a cloud service available via a web browser or a special application.

Additionally, the method 400 may be used for learning device programming basics and principles. For this purpose, the embedded device may include a toy, a lighting accessory, a LED flashing product, for example, a LED flashing bracelet, a LED flashing pendant, and so forth.

Figure 5:
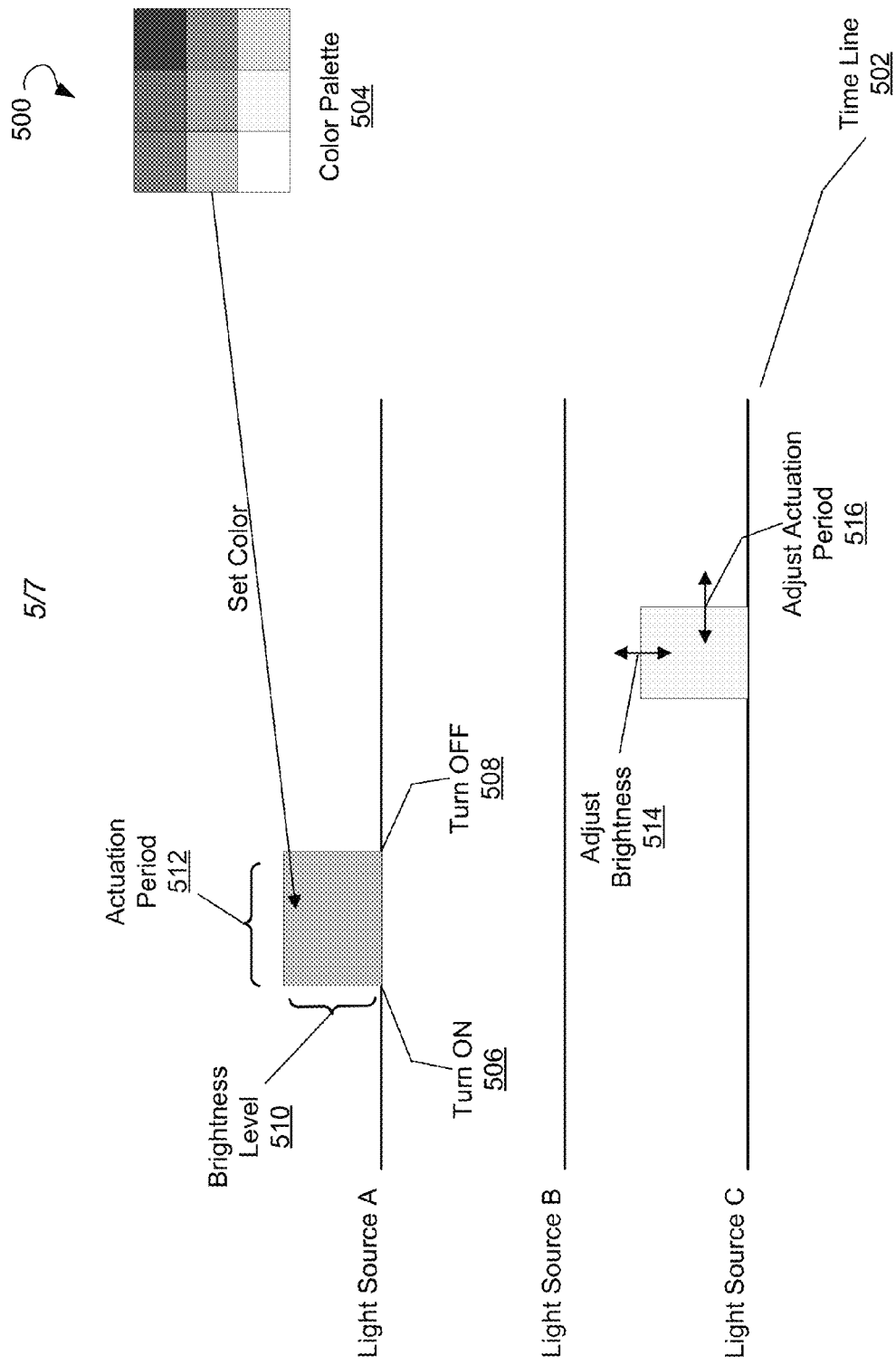
FIG. 5 illustrates example control elements of a GUI for programming an embedded device, in accordance to certain example embodiments.

FIG. 5 illustrates example control elements of a graphical user interface (GUI) 500 for programming an embedded device. The GUI 500 may include one or more time lines 502 associated with different light sources connected to the embedded device. The number of time lines 502 may be selected by the user via the GUI 500.

The time line 502 may be configured to control turning on 506 and turning off 508 of the light sources associated the time line 502. Thus, a period when a light source is actuated may be represented, for example, as a rectangle on the time line 502 associated with this light source. A color palette 504 with a default actuation period 516 and brightness level 510 may be selected and placed on any of the desired time lines 502. The user may move the color palette 504 so that the start of the actuation period 506 is aligned with the desired time on the time line 502. Actuation period 512 may be set by moving the turn OFF 508 to the desired time on the timeline 502. Moreover, the user may set the brightness of the light source. For example, a brightness level 510 of the light source may be represented by a height of the actuation rectangle. The user may adjust the brightness 514 of the light sources by adjusting the height of the actuation period rectangle. Similarly, the actuation period duration may be adjusted 512. For example, the user may make the actuation period shorter or longer by regulating its length.

Settings specified using the GUI 500 may be converted to configuration data and transmitted to the embedded device for real time execution on the embedded device.

Figure 6:
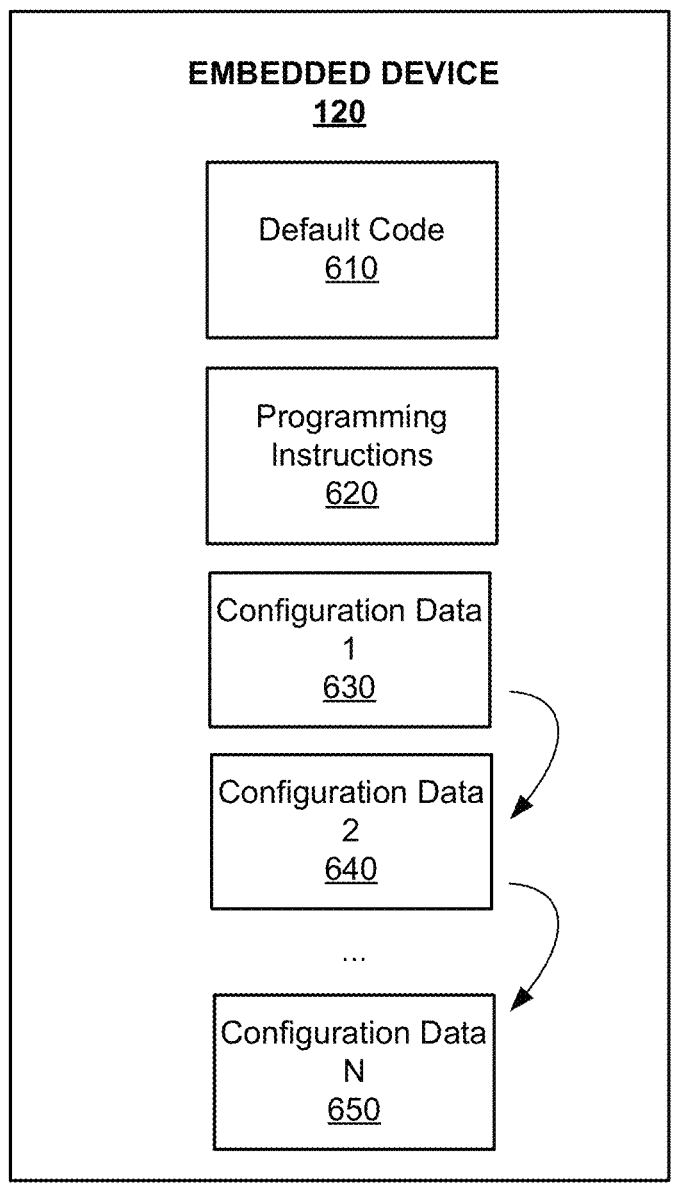
FIG. 6 illustrates an embedded device, in accordance to certain example embodiments.

FIG. 6 shows an embedded device 120, in accordance with certain example embodiments. The embedded device 120 may store default code 610 (boot loader), programming instructions 610 embedded in the embedded device 120, and, optionally, one or more sets of configuration data 630-650. The configuration data 630-650 may be transmitted to the embedded device 120 by the system for programming an embedded device. The configuration data 630-650 may have a format compatible with the programming instructions 620. Thus, the configuration data 630-650 may be decoded and executed by the embedded device 120.

Based on the settings of the iteration element for a set of the configuration data 630-650, the lighting pattern defined by the set may repeat in a round robin manner.

Additionally, a user may actuate a transition from one of the sets of the configuration data 630-650 to another one, for example, from the configuration data 630 to the configuration data 640.

Thus, the sets may be executed by the embedded device 120 consecutively or one of the configuration data 630-650 may be repeated in a round robin manner.

Figure 7:
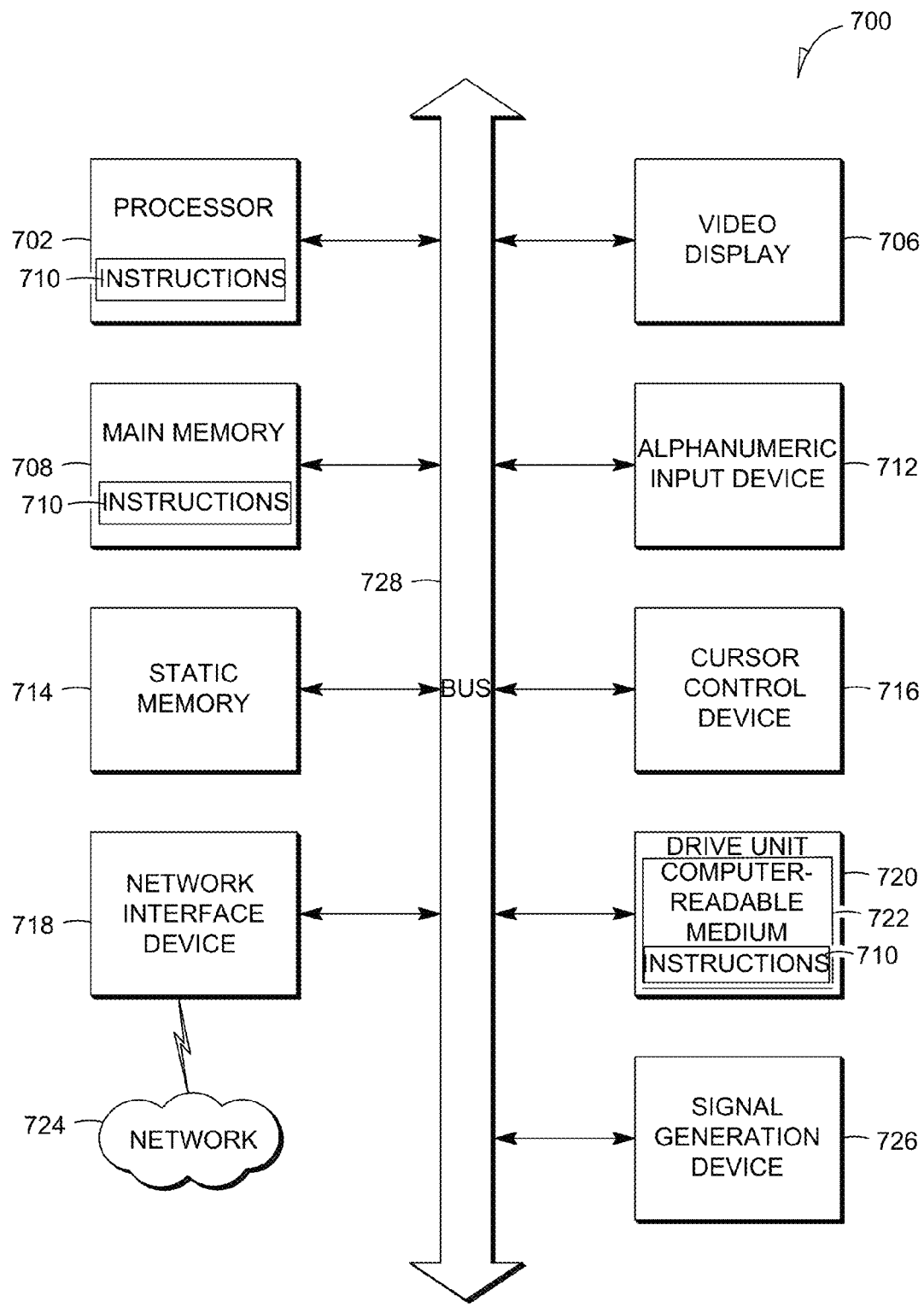
FIG. 7 shows a diagrammatic representation of a computing device for a machine in the exemplary electronic form of a computer system, within which a set of instructions for causing the machine to perform any one or more of the methodologies discussed herein, can be executed.

FIG. 7 shows a diagrammatic representation of a machine in the example electronic form of a computer system 700, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a PDA, a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU), a graphics processing unit (GPU), or both), a main memory 708 and a static memory 714, which communicate with each other via a bus 728. The computer system 700 may further include a video display unit 706 (e.g., a LCD or a cathode ray tube (CRT)). The computer system 700 may also include an alphanumeric input device 712 (e.g., a keyboard), a cursor control device 716 (e.g., a mouse), a disk drive unit 720, a signal generation device 726 (e.g., a speaker) and a network interface device 718.

The disk drive unit 720 includes a computer-readable medium 722, on which is stored one or more sets of instructions and data structures (e.g., instructions 710) embodying or utilized by any one or more of the methodologies or functions described herein. The instructions 710 may also reside, completely or at least partially, within the main memory 708 and/or within the processors 702 during execution thereof by the computer system 700. The main memory 708 and the processors 702 may also constitute machine-readable media.

The instructions 710 may further be transmitted or received over a network 724 via the network interface device 718 utilizing any one of a number of well-known transfer protocols (e.g., Hyper Text Transfer Protocol (HTTP)).

While the computer-readable medium 722 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like.

The example embodiments described herein may be implemented in an operating environment comprising software installed on a computer, in hardware, or in a combination of software and hardware.

Thus, systems and methods for programming an embedded device using a graphical user interface have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A system for programming an embedded device using a graphical user interface (GUI), the embedded device being associated with one or more light sources, the system comprising:
   the (GUI) including control elements associated with the one or more light sources, wherein the control elements include:
      one or more timelines associated with each of the one or more light sources; at least one actuation control element configured to control turning on and turning off one of the one or more light sources, the at least one actuation control element being represented as an actuation rectangle, wherein a length of the actuation rectangle is configurable to adjust a period during which the one of the one or more light sources is actuated, and a height of the actuation rectangle is configurable to adjust a brightness level of the one of the one or more light sources; and
      one or more color palettes configured to define colors of the one or more light sources on the one or more timelines;
   a processor configured to:
   receive, from a user, via the control elements, settings associated with the one or more light sources, the settings defining a lighting pattern of the one or more light sources, wherein the receiving of the settings includes:
      enabling the user to select and place one of the color palettes on one of the timelines;
      enabling the user to move the selected color palette along one of the timelines, wherein the selected color palette is represented as the actuation rectangle;
      receiving the length of the actuation rectangle adjusted by the user to set the period during which the one of the one or more light sources is actuated; and
      receiving the height of the actuation rectangle adjusted by the user to adjust the brightness level of the one of the one or more light sources; and
   convert the settings to configuration data, the configuration data having a format decodable by the embedded device, the embedded device generating a lighting pattern based on the configuration data; and
a database configured to store one or more sets of the configuration data.

2. The system of claim 1, wherein the control elements include an iteration element configured to cause the lighting pattern to be iterated in a round robin manner.

3. The system of claim 1, wherein the control elements include a simulation element configured to simulate the lighting pattern.

4. The system of claim 1, wherein the control elements include a number selector to set a number of the light sources associated with the embedded device.

5. The system of claim 1, wherein the processor is further configured to estimate power consumption of the one or more light sources, the power consumption being associated with the lighting pattern.

6. The system of claim 1, wherein the one or more light sources include one or more light emitting diodes.

7. The system of claim 1, wherein the embedded device is associated with a toy.

8. The system of claim 1, wherein the (GUI) is provided as a cloud service.

9. A method for programming an embedded device using a graphical user interface (GUI), the embedded device being associated with one or more light sources, the method comprising:
providing the (GUI), wherein the (GUI) includes control elements associated with the one or more light sources, wherein the control elements include:
one or more timelines associated with each of the one or more light sources;
at least one actuation control element configured to control turning on and turning off one of the one or more light sources, the at least one actuation control element being represented as an actuation rectangle, wherein a length of the actuation rectangle is configurable to adjust a period during which the one of the one or more light sources is actuated, and a height of the actuation rectangle is configurable to adjust a brightness level of the one of the one or more light sources; and
one or more color palettes configured to define colors of the one or more light sources on the one or more timelines;
receiving, from a user, settings via the control elements, wherein the settings define a lighting pattern for the one or more light sources, wherein the receiving of the settings includes:
enabling the user to select and place one of the color palettes on one of the timelines;
enabling the user to move the selected color palette along one of the timelines, wherein the selected color palette is represented as the actuation rectangle;
receiving the length of the actuation rectangle adjusted by the user to set the period during which the one of the one or more light sources is actuated; and
receiving the height of the actuation rectangle adjusted by the user to adjust the brightness level of the one of the one or more light sources; and
converting the settings to configuration data.

10. The method of claim 9, further comprising transmitting the configuration data to the embedded device, the configuration data being decodable by the embedded device to generate the lighting pattern based on the configuration data.

11. The method of claim 9, wherein the control elements include an iteration element configured to cause the lighting pattern to be executed recurrently in a round robin manner.

12. The method of claim 9, wherein the control elements include a simulation element to simulate the lighting pattern using the (GUI).

13. The method of claim 9, wherein the embedded device stores one or more sets of the configuration data, the one or more sets of the configuration data being applied consecutively.

14. The method of claim 9, further comprising estimating power consumption of the one or more light sources, the power consumption being associated with the lighting pattern.

15. The method of claim 9, wherein the (GUI) is a cloud service.

16. The method of claim 9, wherein the embedded device is associated with a toy.

17. The method of claim 9, wherein the one or more light sources include light emitting diodes.

18. An apparatus comprising:
at least one processor;
a display;
a non-transitory computer-readable storage medium including instructions executable by the at least one processor, the instructions configured to implement a graphical user interface to be displayed on the display for programming a light emitting diode (LED) flashing toy, the LED flashing toy including one or more LEDs, the graphical user interface comprising:
actuation control elements configured to control turning on and turning off the one or more LEDs, wherein the actuation control elements include one or more timelines associated with each of the one or more LEDs, the actuation control elements being represented as actuation rectangles, wherein a length of an actuation rectangle is configurable to adjust a period during which one of the one or more LEDs is actuated, and a height of the actuation rectangle is configurable to adjust a brightness level of the one of the one or more LEDs, wherein the length of the actuation rectangle and the height of the actuation rectangle are configured to be adjusted by a user; and
color control elements configured to control color of the one or more LEDs, wherein the color control elements include one or more color palettes configured to define colors of the one or more LEDs on the one or more timelines, wherein the user is enabled to select and place one of the color palettes on one of the timelines, and wherein the user is enabled to move the selected color palette along one of the timelines, wherein the selected color palette is represented as the actuation rectangle.

* * * * *